Figure 1:
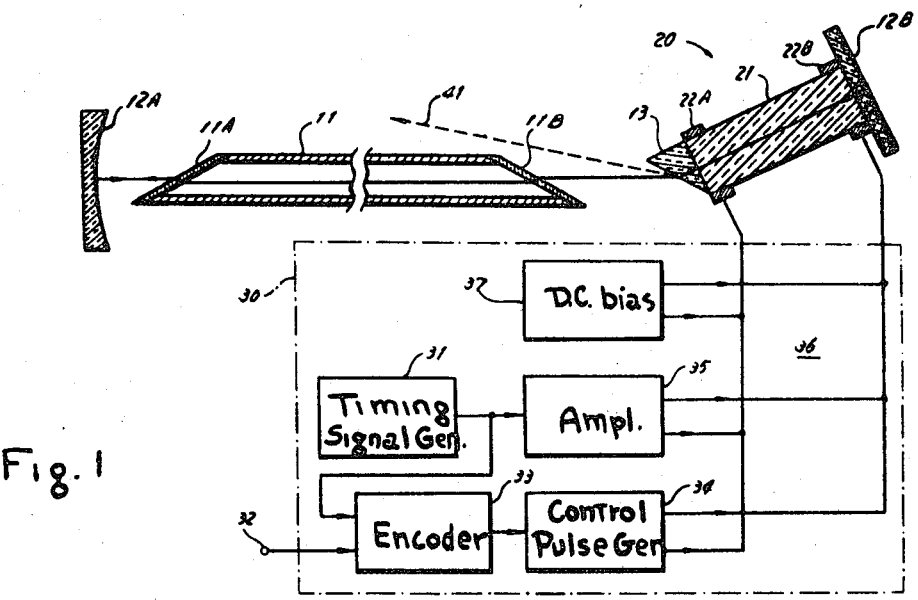

INVENTOR.
T. UCHIDA
BY
Hopgood & Calimafde
ATTORNEYS

United States Patent Office 3,467,915
Patented Sept. 16, 1969

3,467,915
OPTICAL MASER DEVICE OF THE INTERNAL MODULATION TYPE FOR PULSE SIGNAL TRANSMISSION
Teiji Uchida, Tokyo, Japan, assignor to Nippon Electric Company, Limited, Tokyo, Japan, a corporation of Japan
Filed Sept. 27, 1966, Ser. No. 582,373
Claims priority, application Japan, Oct. 13, 1965, 40/62,817
Int. Cl. H01s *3/00;* H04b *9/00*
U.S. Cl. 331—94.5                          1 Claim This invention relates to an optical maser of the internal modulation type and more particularly to an optical maser device which is adaptable to PCM signal transmission.

Optical maser devices of the internal modulation type are disclosed, for example, in my copending application Ser. Nos. 460,712 and 485,684. In both of these, a modulator element of specific construction is interposed within a resonator composed of a pair of mirrors. It is the intention of these inventions to obtain an output laser light as a continuous carrier wave, and consequently the construction is such that the signal to be transmitted intensity- or-frequency-modulates the laser light. These devices are, therefore, satisfactory in case the signal to be transmitted is an analogue signal, such as the aural or video signal (or frequency-divided subcarriers for such analogue signals) but the devices are not necessarily effective where the signal is a PCM or other pulse signal.

Accordingly, it is the object of the present invention to provide an optical maser device of the internal modulation type capable of transmitting a pulse signal with the best possible efficiency and speed.

Briefly, the invention is predicated on the fact that an optical maser device can serve under the specific conditions to be described as a pulse generator of very high repetition frequency and will transmit a pulse signal with excellent efficiency by on-off-controlling every output pulse of the pulse generator by every bit of the pulse signal to be transmitted.

As described in my copending application Ser. No. 536,347, in relation to a helium-neon gas optical maser, the frequency spacing $f_p$ of a plurality of longitudinal modes belonging to a transverse mode (for example, $TEM_{00}$ mode) of the oscillation produced by an optical maser device within a half-value width of about 1000 m.c. is approximately given by:

$$f_p = c/2L$$

(where $c$ is the velocity of light and $L$ is the optical path between the mirrors of the optical resonator) but varies with time due to the intrinsic non-linearity of the optical maser action which undesiredly serves as a source of noise. In order to stabilize the frequency spacing $f_p$, forced phase locking was proposed in Application Ser. No. 576,347, wherein a drawing (locking) effect is applied to the longitudinal mode components by the side band components resulting from an intensity modulation of the laser light effected by an exciting signal of nearly the same frequency as the theoretical value of the frequency spacing $f_p$. Instead of forcibly fixing the frequency spacing by an external exciting signal, self phase locking is possible, where the oscillation of the optical maser device is reinforced (and the mechanical vibration and other disturbances are suppressed) and where positive use is made of the intrinsic third-order non-linearity of the optical maser action. While the foregoing is deemed sufficient for an understanding of the present invention, greater detail on self phase locking is available in a paper entitled "Characteristics of Mode-Coupled Lasers" published by M. H. Crowell in "IEEE Journal of Quantum Electronics," 1965, April issue (vol. QE–1), pages 12–20.

Through observations in the frequency as well as the time domain, I have confirmed that the optical maser output light, whose frequency spacing between the longitudinal modes is stabilized by forced or self phase locking, is different from the output light which is not phase locked and has deviations in the frequency spacings and fluctuation with time in the frequency spacings, in a wave form of pulses whose repetition frequency is approximately equal to $f_p$. The fact that an optical maser output light having fixed frequency spacing consists of pulses of a given repetition frequency is pointed out not only in the Crowell article but also by L. E. Hargrove et al. in "Applied Physics Letters," July 1, 1964 (vol. 5, No. 1), pages 4–5. C. C. Cutler in "Proceedings of the IRE," 1955 February issue (vol. 43, No. 2), pages 140–148, earlier noted that a microwave oscillator produces pulses of high repetition frequency when each of the frequency spacing between the adjacent modes is locked to a certain value.

A quantitative analysis of the fact that an output light spectrum, wherein the frequency spacing between the longitudinal mode components is locked, is composed of pulses whose time spacing is fixed (i.e., whose repetition frequency is stabilized), may be had by reference to A. Yariv in "Journal of Applied Physics," 1965, February issue (vol. 36, No. 2), pages 388–391. Yariv's results will be outlined hereunder for an understanding of the present invention.

If it is assumed that $n$ longitudinal-mode oscillations of equal strength are contained in a single oscillation of transverse mode $TEM_{00}$, and in case the frequency spacing $f_p$ between $n$ successive longitudinal-mode oscillation outputs is locked to this frequency spacing $$f_p = c/2L = w_p/2\pi$$

the electric field $C_a(t)$ of the $a$th longitudinal-mode oscillation output (among the $n$ longitudinal modes) as counted from the center frequency output in the sense of increasing frequency, is given by $$C_a(t) = E \cdot e^{j[w_0 t + a(w_p t + A)]}$$

where E is the amplitude of the electric field component; $w_0$ is the angular frequency of the mode assuming the center of the $n$ longitudinal modes; and A is the phase of the beat component between the successive longitudinal modes. The total electric field $C_n(t)$ of the $n$ longitudinal modes is given by $$C_n(t) = \sum_{a=-(n-1)/2}^{(n-1)/2} E \cdot e^{j[w_0 t + a(w_p t + A)]}$$

$$= E \cdot e^{jw_0 t} \cdot \frac{2 \sin\left[\frac{n}{2}(w_p t + A)\right] \sin\left[\frac{1}{2}(w_p t + A)\right]}{1 - \cos(w_p t + A)}$$

$$= E \cdot e^{jw_0 t} \cdot \frac{\sin[n(w_p t + A)/2]}{\sin[(w_p t + A)/2]}$$

so that the total output power P(t) of the optical maser device is given by $$P(t) = C_n(t) \cdot C_n^*(t) = E^2 \cdot \frac{1 - \cos[n(w_p t + A)]}{1 - \cos(w_p t + A)}$$

where $C_n^*(t)$ is the complex number conjugate to $C_n(t)$.

From the last-cited equation, it is apparent that, in the case where $n$ is large, the optical maser output light is composed of sharp pulses having a repetition frequency of $w_p/2\pi$ or $f_p$. The fact that the repetition frequency is approximately equal to $c/2L$ suggests that, in a phase locked optical maser device, an optical pulse goes back and forth between the two mirrors spaced by L with a speed of the light velocity $c$ or that the optical pulse reaches the output side (for example, one of the mirrors) of the optical maser device at a period of $2L/c$ and becomes an optical pulse output of a repetition frequency $c/2L$.

It should be understood, that while an optical maser output light may be obtained with stabilized repetition frequency, the desired pulse signal transmission is impossible so long as on-off control is not performed in strict synchronism with the pulse train of the output light. It is the present invention which makes such synchronization possible with an optical maser device of the internal modulation type disclosed in the aforementioned copending patent applications.

The above mentioned and other features and objects of this invention and the manner of attaining them will become more apparent and the invention itself will best be understood by reference to the following description of an embodiment of the invention taken in conjunction with the accompanying drawings wherein:

FIG. 1 is a longitudinal sectional view of an embodiment of this invention, shown partly in blocks; and FIGS. 2(a)–2(d) illustrate simplified wave forms for explaining the operation of the embodiment.

Referring now to FIG. 1, an optical maser device is shown comprising a gas discharge tube 11 having optical maser action and also Brewster windows 11A and 11B, each of whose normals makes the Brewster's angle with the tube axis; a mirror 12A serves as one of the mirror pair of the optical resonator; and a modulation signal circuit 30 supplies the modulation voltage to the composite modulator element 20.

The modulator element 20 (which is also described in my copending application Ser. No. 485,684) comprises a crystal piece 21 made of a single crystal of KDP or another crystal showing small light absorption characteristics and having a large electro-optical effect, or the effect, under an electric field in the direction of the optical axis (Z axis) of the crystal, of rotating the plane of polarization of the light incident in the direction of the optical axis and which is formed into a rectangular parallelepiped elongated in the direction of the optical axis. A birefringence prism 13 is disposed to the left of the crystal and is made of calcite, formed into a triangular prism having a first side surface parallel with the optical axis of calcite, and a second side surface serving, together with the first side surface, as the input and the output surfaces for the light. The angle between the first and second side surfaces is equal to the complementary angle (about 34°) of the Brewster's angle relating to the refractive index (about 1.49) of the extraordinary rays. The first side surface is attached, with an optical adhesive, to one of the end surfaces of the crystal piece 21 in such a manner that the optical axis is parallel to the X or the Y axis of the crystal piece 21. Another mirror 12B is attached to the other end surface of the crystal piece 21 so as to form an optical resonator together with mirror 12A. Finally a pair of electrodes 22A and 22B are attached to crystal piece 21 in the neighborhood of the end surfaces so as to supply across the crystal piece, and in the direction of its optical axis, the modulation voltage from the modulation signal circuit 30.

The modulation signal circuit 30 comprises a timing (synchronizing) signal generator 31 for producing a timing signal of a repetition frequency substantially equal to the frequency $f_p$ defined by the quotient $c/2L$, where $c$ is the velocity of light and L is the optical path between the mirrors 12A and 12B. An encoder 33 is supplied by input terminal 32 with the information signal to be transmitted and with the timing signal from the timing signal generator 31, for producing a PCM signal whose bit frequency is equal to the frequency of the timing signal. A control pulse generator 34 produces a pulse of an amplitude and polarity to be described below, each time the output of the encoder 33 is "O." An amplifier 35 is provided for the timing signal and connections 36 supply the outputs of the control pulse generator 34 and this amplifier to the electrodes 22A and 22B. A direct-current bias source 37 superposes, on the timing signal supplied to the connections 36, a direct-current component of a magnitude to be mentioned later. The timing signal generator 31 and encoder 33 may be a frequency-stabilized conventional VHF sinusoidal oscillator and a high-speed encoder for encoding, as the case may be, a plurality of transmission signals into a time-division multiplexed PCM signal, respectively. The control pulse generator 34 may be a conventional pulse generator operable only in response to "O" bits.

As explained in the above-cited application, Ser. No. 485,684, the application of a modulation voltage across the crystal piece 21 at the electrodes 22A and 22B results in the production, from the birefringence prism 13 along a broken line 41 of FIG. 1, of a modulated output light which corresponds to the modulation voltage and having a plane of polarization perpendicular to the plane of polarization of the light reciprocating within the optical maser device. Furthermore, as described in the above-mentioned application, Ser. No. 536,347, the phase locking of the longitudinal-mode oscillations is achieved by supplying a timing signal of the frequency $f_p$ approximately equal to $c/2L$, between the electrodes 22A and 22B, so as to modulate that loss of the optical resonator to be explained. As a result of this phase locking, the modulated output light appearing along the broken line 41 becomes a pulse train consisting of shap pulses of the repetition frequency $f_p$.

As mentioned above, the repetition frequency $f_p$ is, where the optical path L between a pair of mirrors is about 1 m., nearly equal to 150 mc. (given by $c/2L$), assuming that an optical pulse is reciprocating with the light velocity $c$ over the optical path L within such an optical maser device. Since the optical path within the modulator element 20 is about 2 cm. and is sufficiently results made it clear that the single optical pulse required for the light to travel through the modulator element 20 may be neglected in the following. Experimental results made it clear that the single optical pulse reciprocating within the optical maser device reaches the modulator element 20 at each point in time when the resonator loss assumes a minimum value in response to the timing signal and that a portion of the energy of the optical pulse appears as the modulated light along the broken line 41.

Figure 2:
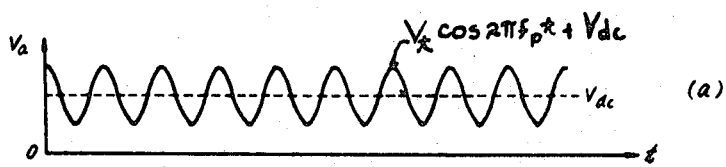
Figure 2:
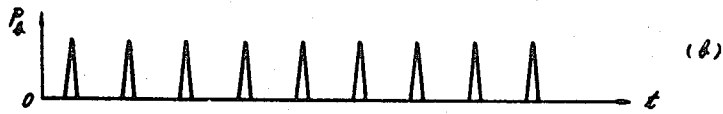
Figure 2:
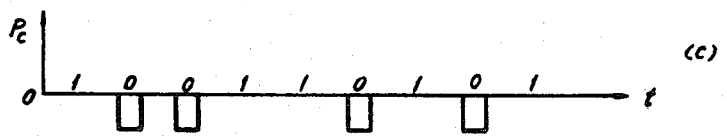
Figure 2:
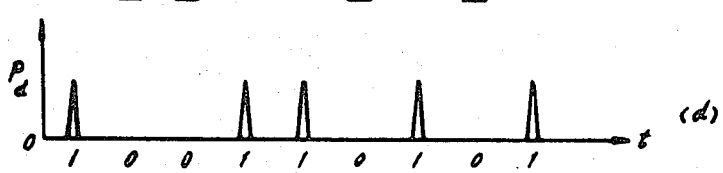

In FIG. 2(a) a voltage $V_a$ is shown which is the superposition of the direct-current bias voltage $V_{dc}$ on the timing signal $V_t \cos 2\pi f_p t$ as amplified at the amplifier 35. This voltage is supplied across the crystal piece 21 while there is no modified PCM signal produced by the control pulse generator 34. The optical maser device produces, from the birefringence prism 13 along the broken line 41, output pulses $P_b$ (FIG. 2(b)) in synchronism with the minima of the voltage $V_a$ where the loss of the reasonator becomes minimum. (Although not apparent from the figure, it will be understood that the direct-current bias voltage $V_{dc}$ has a larger value than the amplitude of the timing signal.)

The relation between the afore-mentioned voltage $V_a$ and the optical pulse output $P_b$ will now be examined more quantitatively. If the intensity (power) of the light which is produced within the device and incident onto the modulator element 20 from the left side of FIG. 1 is denoted by $I_0$, the intensity I of the output light which is modulated by the voltage V supplied between the electrodes 22A and 22B and which proceeds along the broken line 41 is given, as derived in "Proceedings of the IRE," 1962, April issue (vol. 50, No. 4), pages 452–456 (Equation 6 on page 454 of this article), by $$I = I_0 \frac{1 - \cos \pi (2V/V_0)}{2} (1 - k) \quad (1)$$

where $V_0$ is a constant dependent on the wave length of the generated light and the material of the crystal piece 21 and $k$ is the reflection coefficient for the light which is incident onto the output surface of the birefringence prism, and then proceeds along the broken line 41. On the other hand, the above-mentioned voltage $V_a$ is the difference between the direct-current bias voltage $V_{dc}$ and the timing signal $V_t \cos 2f_p t$ and is given by $$V_a = V_{dc} - V_t \cos 2\pi f_p t \quad (2)$$

(the righthand side of this Equation 2 must in principle be given by the sum but it is given here by the difference for convenience of explanation in view of the fact that the second term of the righthand side is a cosine function). Therefore, the intensity I of the optical pulse output is given, from the Equations 1 and 2, by $$I = \frac{I_0}{2} \left[ 1 - \cos 2\pi \frac{V_{dc} - V_t \cos 2\pi f_p t}{V_0} \right] (1 - k) \quad (3)$$

from which it may be understood that the generated light undergoes intensity modulation of the repetition frequency $f_p$ so long as the direct-current bias voltage is greater than the timing signal. Furthermore, it is recognized that the intensity I assumes the maximum value, namely, the loss of the resonator reaches a minimum, when the numerator $V_{dc} - V_t \cos 2\pi f_p t$ of the fraction enclosed with the brackets in the righthand side assumes the minimum value $/V_{dc}/ - V_t$. As mentioned, an optical pulse reaches the modulator element 20 at each of these time points. Moreover, it will be appreciated that, in case the voltage $V_{dc}$ is positive, the application of a control pulse $$-(V_{dc} - V_t)$$

from the control pulse generator 34 at the moment of appearance of the minimum voltage $V_{dc} - V_t$ prevents the minimum value from actually occurring to control the production of the optical pulse. On the other hand, the optical pulse $P_b$ and the PCM signal $P_c$ are in synchronism as exemplified in FIGS. 2(b) and 2(c), because the encoding action of the encoder 33 is in bit synchronism with the timing signal. It therefore becomes possible to on-off control the optical pulses and to produce an output pulse train $P_d$ (FIG. 2(d)) as predicted from the Equation 3. FIGS. 2(c) and 2(d) show control pulses $P_c$ and the resultant output optical pulses $P_d$, respectively, corresponding to an output code train (100110101) of the encoder 33.

In order to maintain the synchronism between the generated optical pulses $P_b$ and the output pulses $P_c$ of the control pulse generator 34, the above-defined frequency spacing $f_p$, namely, the frequency of the timing signal, must be as near to $c/2L$ as possible. It has been noted that favorable synchronism is maintained where the frequency $f_p$ of the timing signal is from scores of kilocycles to several hundred kilocycles lower than the value of $c/2L$. Although the actual timing frequency deviates from the value aimed at, such a deviation may be conveniently compensated by fine adjustment of the optical path between the mirrors 12A and 12B.

Although a frequency near $c/2L$ is selected for the frequency $f_p$ of the timing signal used in the above-explained embodiment, it is possible by employing forced phase locking by a timing signal of larger amplitude and of a frequency nearly equal to an integral multiple of $c/2L$, to obtain optical output pulses of the same repetition frequency as that of the timing signal. For example, it is possible in this way to produce optical pulse output of twice, three times, and four times as high repetition frequency as $c/2L$ with a helium-neon gas optical maser having mirrors 12A and 12B spaced apart by an optical path of 1 m. Furthermore, there is the possibility of obtaining optical pulse output of more than five times as high frequency as $c/2L$ under some suitable circumstances. It should therefore be understood that the frequency of the timing signal is not necessarily limited to that used in the above-mentioned embodiment.

In the described embodiment, the repetition frequency of the control pulse is no higher than a half of the timing signal frequency and therefore these two signals which are separated from each other in frequency be supplied by the common connections 36 between the electrodes 22A and 22B. If it is necessary to carefully differentiate one of the signals from the other, it is possible to furnish the crystal piece 21, between the electrodes 22A and 22B, with another pair of similar intermediate electrodes and to supply the signals to the respective pairs of electrodes. For the same purpose, it is also possible to modify the embodiment by interposing a modulator element described in the above-referenced application Ser. No. 460,712 between the discharge tube 11 and the composite modulator element 20 and to supply the control pulses and the timing signal across the composite modulator element and the additional modulator element, respectively, while supplying the direct-current bias voltage across either of the elements. With those modifications, the timing signal on which the direct-current bias voltage is superposed and the control pulses do not produce a sum voltage, but similar effects of modulation are achieved because the generated light is modulated by both of the voltages. Furthermore, the control pulses may not necessarily be furnished with the polarity described in conjunction with the embodiment, but may be of such polarity and height as may produce the output optical pulse in the direction of the broken line 41 only when the output of the control pulse generator 34 is not zero. Again, the codes to be transmitted with this invention are not limited to the PCM signal but may be any of pulse signals of other types, such as the delta-modulation signal.

While the principles of the invention have been described in connection with specific apparatus, it is to be clearly understood that this description is made only by way of example and not as a limitation to the scope of the invention as set forth in the objects thereof and in the accompanying claims. For example, most of the embodiments and modifications disclosed in the above-cited copending patent applications, and particularly the embodiment shown in FIG. 1 of application Ser. No. 485,684 and the modifications, are applicable to the present invention.

What is claimed is:

1. An optical maser device of the internal modulation type for pulse signal transmission comprising: an optical beam producing element including an active substance having optical maser action; a pair of mirrors disposed to substantially reciprocate the optical beam generated by said element therebetween; a crystal member of large electro-optical effect, having two end surfaces formed perpendicularly to one of the optical axes, disposed between said mirrors to propagate said optical beam along the axis; means for applying a timing signal voltage across said crystal member piece for modulating said optical beam, said timing signal voltage having a frequency determined by the light velocity and the optical path between said mirrors; means for applying a pulse signal across said crystal member for modulating said optical beam, said pulse signal representing the information to be transmitted and being in substantial synchronism with said timing signal; and a birefringence prism, which has at least one side surface satisfying the Brewster's reflectionless condition, coupled to said optical beam and interposed between said element and said crystal member in such manner that the plane of polarization of said optical beam and the prism's optical axis may be in one of a prependicular and a parallel relationship.

References Cited

UNITED STATES PATENTS 3,405,370  10/1968  Kaminow _____ 332—7.51

JOHN KOMINSKI, Primary Examiner

U.S. Cl. X.R.

250—199; 332—7.51